Dec. 27, 1966     E. LAIMINS ETAL     3,295,086

MULTI-RANGE LOAD CELLS

Filed July 2, 1964

INVENTORS:
ERIC LAIMINS
BERNARD H. SHAPIRO
BY
Dike, Thompson, Bronstein & Mrose
ATTORNEYS

United States Patent Office 3,295,086
Patented Dec. 27, 1966

3,295,086
MULTI-RANGE LOAD CELLS
Eric Laimins, Cambridge, and Bernard H. Shapiro, Sudbury, Mass., assignors to BLH Electronics, Inc., Waltham, Mass., a corporation of Delaware
Filed July 2, 1964, Ser. No. 379,855
5 Claims. (Cl. 338—5)

The present invention relates to multiple-range force-measuring devices of the type employing electrical strain measuring means, and, in one particular aspect, to improvements in load-cell apparatus having at least two serially-coupled load-sensing elements which display optimum operating characteristics within different ranges of applied loading.

Load cells of a variety of configurations have heretofore been exploited for the accurate measurement of tensile or compressive forces to which they are exposed; common commercial forms of such devices have included columns, beams, rings and other sensing elements which are capable of withstanding large forces and of exhibiting related surface strains which are conveniently measurable by electrical resistance strain gages. Sensitive electrical components of such devices generally require protection against deleterious environmental influences, and the sealing equipment which is used for this purpose must be so arranged as to avoid undue disturbance of the desired relationships between applied forces and the resulting electrical measurements. Load cell operating characteristics tend to be optimum within certain ranges of applied forces, such that separate cells of different designs are often prescribed for highly sensitive and accurate measurement of forces expected to occur at distinctly different levels. Where more than one measurement range is of critical interest in the evaluation of a system involving widely-varying forces, it may prove necessary to utilize more than one load cell, and to repeat system operations with different cells performing the measurements at different times. The latter technique tends to be costly and time-consuming, and, in some instances, the nature of the system operation undergoing measurement may be such that it cannot conveniently be interrupted or repeated to permit the needed substitution of load cells.

In accordance with the present teachings, however, two or more load cells may be combined, serially, in a single compact sealed housing to effect both economy in construction and simplification of testing procedures. Automatic mechanical stopping, and mechanical isolation of unavoidable sealing diaphragm forces, insure that the cells are well protected against damage and that highly regular and predictable electrical output characteristics are realized.

It is one of the objects of the present invention, therefore, to provide novel and improved multi-range load cells wherein load cell units combined in series effect optimum measurements of applied load forces over different ranges.

Another object is to provide a versatile multi-range load cell of economical construction having at least two load-sensing elements within a single sealed housing and involving mechanical stop provisions which serve to isolate high- and low-range elements.

A further object is to provide improved load cells having both relatively narrow-range and broad-range load-sensing elements sealed within a common housing by diaphragms which are arranged to eliminate irregularities in the force vs. output characteristics of the cells.

Still further, it is an object to provide multi-range load cells capable of responding accurately to either tension or compression forces with optimum sensitivities in different ranges of operation.

By way of a summary account of practice of this invention in one of its aspects, a narrow-range load cell sensing element is mechanically connected in series alignment with a broad-range load cell sensing element, to produce a two-stage structural unit which is capable of carrying a broad range of loads in tension or compression. In accordance with known practices, one of the load cell elements is designed to exhibit high levels of surface strains, at predetermined areas, which are accurately related to applied tension or compression forces within a range of relatively low values. The other load cell element is likewise essentially of a known construction, although designed to exhibit surface strains, at measurement sites, which characterize the applied forces over a broader range than that of the first load cell. Electrical resistance strain gages sense the surface strains in both cells, in the usual manner. At the locus of the mechanical juncture between the two cells, the structural unit is rigidly secured to a coaxially-surrounding impervious housing, and at each extremity of the structural unit a different pair of sealing diaphragms is connected between the housing and structural unit. In parallel with the narrow-range load cell, and forming part of the structural unit within the housing, there is disposed a dual-directional mechanical stopping arrangement which normally has no effect upon either the narrow-range or broad-range cell but which mechanically shunts the narrow-range cell when either the applied tension or compression force exceeds a predetermined value. Electrical output signals from both of the cells are found to be highly regular over their respective ranges of operation.

Although the aspects of this invention which are believed to be novel are set forth in the appended claims, additional details as to preferred practices of the invention and as to the further objects, advantages, and features thereof may be most readily comprehended through reference to the following description taken in connection with the accompanying drawings, wherein:

Figure 1:
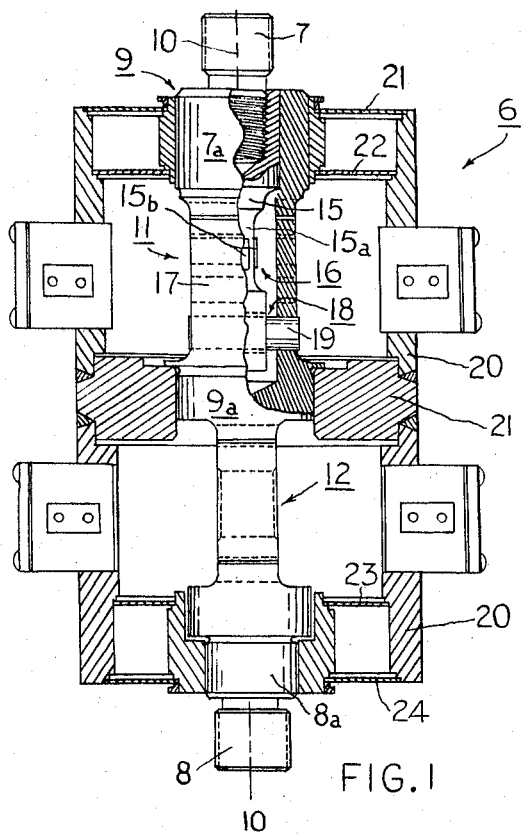
FIGURE 1 is a partly cross-sectioned view of a multi-range load cell constructed in accordance with the present teachings.
Figure 2:
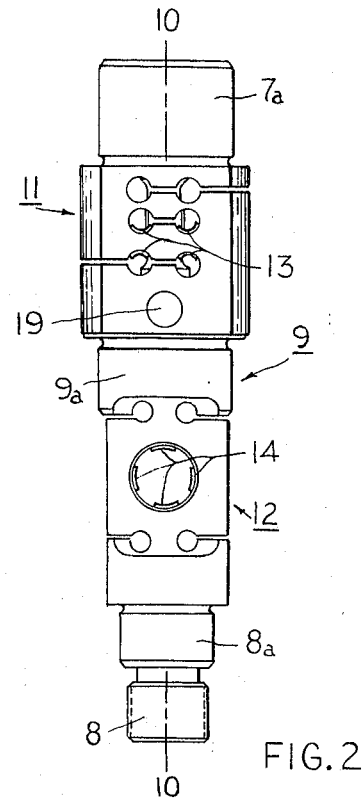
FIGURE 2 is a pictorial illustration of the multi-stage load cell structural unit appearing in the apparatus of FIGURE 1, with the unit being viewed from a different side thereof.

The force-measuring equipment 6 depicted in FIGURE 1 is of a type which includes two spaced threaded end connections 7 and 8 between which measured forces in either tension or compression are transmitted from outside. These end connections are fixed securely in relation to the elongated central load-sensing structural unit 9 (portrayed separately in FIGURE 2) which is symmetrically arranged about the axis 10—10, the latter axis also being that with which the externally-applied forces are aligned. Connector 8 is shown to be formed integrally with one end, 8a, of unit 9, although connector 7 is threaded into the opposite end, 7a, of the unit, for adjustment or removal purposes. Load-sensing unit 9 is preferably fashioned from a single mass of strain-responsive metal which is suitable for carrying the intended loads, and includes two distinct load cell elements, 11 and 12, which are respectively formed between the different ends 7a and 8a and a common integral intermediate section 9a. Load cell element 11, which is of a slotted tubular form responding well to low levels of applied forces, is thus mechanically in series with the load cell element 12 which has a different ring form better lending it to measurement of higher levels of applied forces. Typically, the element 11 may occasion optimum electrical output signals, by way of its associated bonded electrical resistance filament strain gages 13, over the relatively low force range of 0–6000 pounds, whereas the element 12 may cause its associated strain gages 14 to develop useful output signals over a broader force range up to about 6,000 pounds. It has been found to be important to certain operating characteristics that the low-range cell 11 be mechanically shunted out of the system when either tension or compression forces which are in excess of its intended force range are encountered. For this purpose, a columnar stop member 15 is nested within the central longitudinal bore 16 of the generally tubular element 17, and has one end fitted tightly within unit end 7a while the opposite end having a transverse cylindrical opening 18 in it is normally suspended free. A cooperating second stop member, in the form of a cylindrical pin 19 having a somewhat smaller diameter than that of opening 18, likewise extends transversely of the longitudinal axis 10—10 and is normally loosely oriented centrally of the opening 18 in stop member 15. Loads in excess of the rated maximum for cell 11 result in sufficient compression or elongation of the longitudinally flexible tubular member 17 and the unit end 7a to cause the normally free end of stop member 15 to engage the relatively fixed pin 19 about inner wall surfaces of the opening 18. At such times, the load cell 11 is essentially shortened or shunted, and the applied load cannot further compress or elongate the tubular cell element 17; instead, the increased load forces are transmitted through the load cell 12 and the engaged stop members 15 and 19. Load cells 11 and 12 are of constructions generally like those separately described in U.S. Patents Nos. 3,004,231 and 2,561,318, respectively, and further discussions of their detailed features are thus not essential here. However, those skilled in the art will appreciate that other load cell designs may also be substituted in the series-combined structure of sensing unit 9.

Importantly, the intermediate portion 9a between the load cells 11 and 12 of the sensing unit 9 is fixed in position relative to the surrounding rigid cylindrical casing or outer housing 20, whereas the axial extremities 7a and 8a of the same unit are both connected with the casing by way of axially-yieldable pairs of stabilizing and sealing members 21, 22 and 23, 24, respectively. Preferably, both of the members in each pair are in the form of diaphragms, which effect hermetic sealing of the assembly. As shown, the casing 20 may conveniently be formed of two cylindrical parts welded together with the annular ring or base 21 into which the intermediate portion 9a of unit 9 is tightly fitted. Casing 20 is thus "floated" with the intermediate portion 9a of the sensing unit by which the external loading is mainly carried, and the only applied loading it bears is that which is transmitted through it upon deflection of the diaphragms. It should be observed that each of the load cells 11 and 12 is thereby separately parallelled by its associated diaphragms, and the forces experienced by each of these cells are at all times diminished only by the amounts by-passed through its own diaphragms. In this manner, troublesome irregularities in force vs. output characteristics which could otherwise result when the stops engage are entirely avoided.

Figure 4:
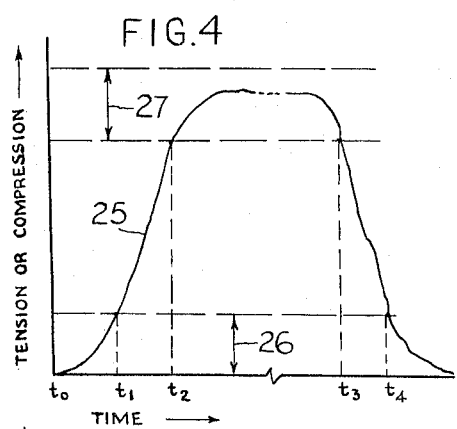
FIGURE 4 is a diagram characterizing force vs. time variations which are well measured by the improved load cell apparatus.
Figure 3:
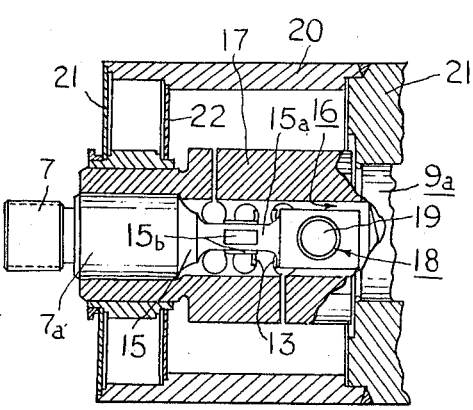
FIGURE 3 illustrates a multi-range load cell assembly, partly in cross-section, wherein a mechanical stopping arrangement itself serves as a load cell.

Curve 25 in FIGURE 4 represents one type of transient force condition, such as thrust, which may advantageously be measured by the multi-range load cell. Between times $t_0$ and $t_1$, and beyond time $t_4$, the measured force is below a first level, 26, which is accurately measured by the low-range load cell element 11. Between times $t_1$ and $t_4$, the higher forces result in engagement of the stop members 15 and 19, and the output of the broader- or higher-range load cell element 12 provides the measurements. A third load cell, conveniently formed by the columnar stop member 15, is also utilized to advantage. In both FIGURES 1 and 3, this columnar member is shown to have a necked-down portion 15a which carries bonded electrical resistance strain gage elements 15b; these gages develop electrical measurement signals in a well-known manner. Such column-type load cells, per se, have been used before, of course. Depending upon the specific mechanical and electrical designs selected for use in manufacture of the various load cell elements of the overall assembly, one may, for example, cause the load cell element 15 to develop optimum sensitivity in the critical high force range 27 (FIGURE 4), or, alternatively, the output of that load cell element may be caused to duplicate or replace that of load cell element 12. In the latter event, load cell element 12 may instead be designed to produce optimum output signals in the high force range 27. Load cell element 15, which is part of the stopping mechanism, becomes operative to produce measurement output signals when the stopping occurs following increase in applied loading beyond a predetermined level. So much of the assembly as is depicted in FIGURE 3 thus permits measurements of both low and high levels of loading, in either tension or compression. It will also be recognized that the series-connected load cell element 12 may be designed to operate in a low, rather than high, range of loadings, and that for some purposes it may likewise be associated with a further stop mechanism, such as a stop mechanism functioning as a strain-sensitive element. Multiple stop mechanisms, all or some of which function as strain-sensitive elements within various force ranges of interest, may also be associated with the conventional types of strain-sensitive elements, such that the designer is thereby afforded a highly useful tool for obtaining optimum measurements within different force ranges.

Figure 5:
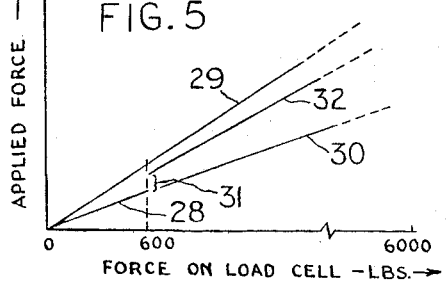
FIGURE 5 graphically portrays the influence of sealing diaphragm forces on measurement of applied forces.

The representative graphical portrayal in FIGURE 5 makes clear the advantage of isolating the respective pairs of diaphragms by confining their effects to different sides of the intermediate base 21. Forces on load cell elements 11 and 12, shown approximately by plot 28, is less than the applied force, plot 29, by amounts representing the by-pass effects of both pairs of diaphragms (21, 22 and 23, 24, respectively); however, the load cell element 11 is effective only up to some moderate loading, such as the illustrated 600 pound level, after which it is shunted out by the stopping members. Plot 30 characterizes the loading experienced by load cell element 12, and is found to be highly regular and linear over its broad range of use. At all times, its loading is less than that of the applied forces only by the amount by-passed through its own associated diaphragms 23 and 24; all the loading applied to end coupling 7 is always passed to cell element 12, whether through cell element 11, diaphragms 21 and 22, and/or stop members 15 and 19. If, on the other hand, the base were not in the intermediate location between the two main cell elements, the loading of cell element 12 would have a discontinuity at the site bracketed at 31 and extended by line 32, in FIGURE 5, and regularity and linearity of that cell element's output would be disturbed.

It should be understood that the specific embodiments and practices herein described have been presented by way of disclosure rather than limitation, and that various modifications, substitutions and combinations may be effected without departure in spirit or scope from this invention in its broader aspects.

What we claim as new and desire to secure by Letters Patent of the United States is:

1. Force measuring apparatus comprising at least two strain-sensitive load cell elements each including different electrical strain gage means and each differently responsive to forces applied along an axis thereof, means mechanically connecting one of said strain-sensitive elements in series with another of said elements colinearly along said axis, mechanical stop means shunting one of said strain-sensitive elements and including stop members engageable to transmit applied forces therethrough when the applied forces are beyond a predetermined value, a substantially rigid casing in enclosing relationship to said strain-sensitive elements, flexible means sealing the unconnected ends of said elements within said casing and preserving said elements in alignment along said axis, means rigidly securing said casing with said elements at a position intermediate said flexible means where said elements are mechanically connected together, and means for applying forces to said strain-sensitive elements in series along said axis and through said flexible means.

2. Force measuring apparatus comprising at least two strain-sensitive load cell elements each including different electrical strain gage means and each differently responsive to forces applied along an axis thereof, means mechanically interconnecting one end of one of said elements and one end of another of said elements and thereby maintaining said elements in series colinearly along said axis, mechanical stop means shunting one of said series-connected strain-sensitive means between the end connected with the other of said elements and the opposite end thereof, said stop means including cooperating stop members engageable to transmit forces therethrough when the applied forces in either direction are in excess of a predetermined value, a substantially rigid casing in enclosing relationship to said strain-sensitive elements, flexible diaphragm means extending between said casing and each of the free ends of said strain-sensitive means opposite said ends connected by said interconnecting means, means rigidly securing said casing with said interconnecting means at a position intermediate said diaphragm means at said free ends of said elements, and means for applying tension and compression forces to said strain-sensitive elements in series along said axis and through said free ends of said elements.

3. Force measuring apparatus as set forth in claim 2 wherein one of said stop members comprises a strain-sensitive load cell element including electrical strain gage means.

4. Force measuring apparatus as set forth in claim 2 wherein said one of said strain-sensitive elements shunted by said stop means is of substantially tubular form having a longitudinal opening therein extending along said axis, wherein one of said stop members is an elongated columnar member disposed coaxially within the said opening having one end fixed with the free end of said tubular element and having an opening in its opposite end extending transversely to said axis, and wherein the other of said stop members comprises a pin fixed with said one of said elements near said one end thereof and extending transversely to said axis and through said transverse opening in said one of said stop members, said transverse opening being larger than said pin by an amount permitting a predetermined relative movement between said stop members in directions of said axis.

5. Force measuring apparatus as set forth in claim 4 wherein said elongated columnar stop member comprises a strain-sensitive load cell element with electrical strain gage means thereon.

References Cited by the Examiner
UNITED STATES PATENTS

| | | | |
|---|---|---|---|
| 2,057,576 | 10/1936 | Johnson | 73—397 |
| 2,421,222 | 5/1947 | Schaevitz | 73—141 |
| 2,561,318 | 7/1951 | Ruge | 338—5 |
| 2,582,886 | 1/1952 | Ruge | 73—141 |
| 3,004,231 | 10/1961 | Laimins | 338—5 |
| 3,164,014 | 1/1965 | Redner | 338—5 X |
| 3,195,353 | 7/1965 | Pien | 338—4 X |

RICHARD M. WOOD, *Primary Examiner.*

W. D. BROOKS, *Assistant Examiner.*